(12) United States Patent
Maiorana et al.

(10) Patent No.: US 8,845,008 B1
(45) Date of Patent: Sep. 30, 2014

(54) WIND DEFLECTOR FOR A TANK TRAILER

(71) Applicant: Mac LTT, Inc., Kent, OH (US)

(72) Inventors: James A. Maiorana, Hartville, OH (US); Edward D. Mansell, Ravenna, OH (US)

(73) Assignee: MAC LTT, Inc., Kent, OH (US)

( * ) Notice: Subject to any disclaimer, the term of this patent is extended or adjusted under 35 U.S.C. 154(b) by 0 days.

(21) Appl. No.: 13/828,679

(22) Filed: Mar. 14, 2013

(51) Int. Cl.
*B62D 25/00* (2006.01)
*B62D 35/00* (2006.01)

(52) U.S. Cl.
CPC .................... *B62D 35/001* (2013.01)
USPC ...................................... 296/180.4

(58) Field of Classification Search
USPC .......... 296/180.4, 180.3, 185.1, 180.2, 181.5, 296/217; 280/405.1; 220/262, 1.5
IPC ....................................................... B62D 35/00
See application file for complete search history.

(56) References Cited

U.S. PATENT DOCUMENTS

| | | | |
|---|---|---|---|
| 4,057,280 A | 11/1977 | MacCready, Jr. et al. | |
| 4,210,354 A | 7/1980 | Canning | |
| 4,281,869 A | 8/1981 | Saint | |
| 4,301,828 A * | 11/1981 | Martin, Jr. | 137/381 |
| 4,313,635 A | 2/1982 | Front | |
| 6,105,805 A | 8/2000 | Labelle et al. | |
| 6,173,854 B1 | 1/2001 | Labelle et al. | |
| 6,561,373 B1 | 5/2003 | Chapin | |
| 2010/0320727 A1* | 12/2010 | Haut et al. | 280/414.5 |

* cited by examiner

*Primary Examiner* — Pinel Romain
(74) *Attorney, Agent, or Firm* — Sand & Sebolt (57) ABSTRACT

A wind deflector assembly formed about or part of a hatch assembly surrounding an access port of a tank trailer to control wind flow about the hatch assembly to reduce wind drag on the tank trailer. The wind deflector assembly includes a first downwardly forwardly directed smooth surface extending from the hatch assembly toward the front end of the tank trailer and preferably includes a second smooth surface extending downwardly rearwardly from the hatch assembly toward the rear end of the tank trailer. An intervening opening is formed between the spaced wind deflecting surfaces for receiving the access port therein and maybe covered by a smooth closure member.

24 Claims, 12 Drawing Sheets

FIG-11 ial Field
The invention relates to tank trailers and in particular to aerodynamic air deflectors mounted about a hatch assembly which surrounds one or more access ports on the top of the tank body to reduce air drag and increase fuel efficiency.

2. Background Information

It has become increasingly important to increase fuel efficiency of all vehicles including tank trailers to reduce the operating costs of trucking companies. One way of increasing fuel efficiency is to make the vehicles, including the cab and trailers pulled thereby, more aerodynamic thereby reducing wind drag and increasing fuel efficiency.

A considerable number of attachments have been made and used on the cabs and trailers to provide more aerodynamic surfaces, many of which have proved highly effective. However, one area that has yet to be addressed is the reduction of air drag caused by hatch assemblies which surround the access ports located on top of the tank body to provide access into the interior of the tank body. These hatch assemblies usually will have some type of upstanding walls or structure which are adjacent to and surround the access port openings to protect the hatch opening and to facilitate the loading of the material through the access port into the tank storage chamber. Although these hatch assemblies do not provide the large surface areas as do other portions of the tank body or cab such as the front blunt areas thereof, they do provide another area which causes wind drag thereby reducing fuel efficiency. Therefore, if the wind drag caused by these hatch assemblies can be reduced or nearly eliminated, it adds to the efficiency of the tank trailer in reducing fuel consumption.

BRIEF SUMMARY OF THE INVENTION

The wind deflector of the present invention provides a simple yet effective structure for reducing the wind drag caused by the hatch assemblies on the top of tank trailers thereby increasing fuel efficiency.

One aspect of the present invention is to provide an aerodynamic wind deflector having a smooth downwardly tapered surface which is mounted adjacent the front area of a hatch assembly, and which also can be located adjacent the rear portion of the hatch assembly to reduce the formation of eddy currents, which wind deflectors in combination, reduce drag caused by the upstanding members of the hatch assemblies.

Another feature of the present invention is to form the wind deflectors as an integral member providing the protective end walls of a hatch assembly in combination with front and rear aerodynamic wind deflector surfaces connected by side members which form an intermediate opening between the end walls in which is received the access port of a tank trailer.

A further feature of the invention is to provide a wind deflector having front and rear aerodynamic surfaces which is adaptable for tank bodies having one or more access ports by providing corresponding one or more intermediate openings between the front and rear aerodynamic wind deflector surfaces in combination with a smooth continuous surface extending between spaced pairs of intermediate openings to provide for a continuous smooth aerodynamic surface extending from the front deflector surface to the rear deflector surface.

Still another feature of the present invention is to form the air deflector of a rigid preferably metallic material, which can be easily attached to the skin of the tank body or directly to the tank body by rivets or other fasteners afterwhich a sealant is installed around the edges of the wind deflectors to provide for a smooth continuous surface around the deflectors when merging with the existing structure of the hatch assembly and tank body.

A further aspect of the present invention is to provide coverings pivotably or slideably mounted on the wind deflector assembly for covering the access port or ports during transit further reducing the effects of wind drag.

Still another feature of the present invention is to form the wind deflector of a single sheet of rigid material, which has a rear planar edge configured to be complementary to an existing end wall of a hatch assembly for securing to the end wall and to the tank body providing an easy retrofit to the existing hatch assemblies of tank trailers.

These features and aspects of the present invention are achieved by providing a wind deflector assembly which is mounted on or formed as part of the upper surface of a tank trailer, the general nature of which may also be stated as including one or a pair of wind deflectors mounted on the end members of a hatch assembly which are separated by an intervening opening which provides access to an access port therein. These wind deflectors have downwardly tapered surfaces to reduce air drag thereby increasing fuel efficiency during the transport of the tank trailer.

BRIEF DESCRIPTION OF THE SEVERAL VIEWS OF THE DRAWINGS

Preferred embodiments of the invention, illustrated of the best mode in which Applicant contemplates applying the principles, are set forth in the following description and are shown in the drawings and are particularly and distinctly pointed out and set forth in the appended claims.

Similar numbers refer to similar parts throughout the drawings.

DESCRIPTION OF PREFERRED EMBODIMENT

Figure 1:
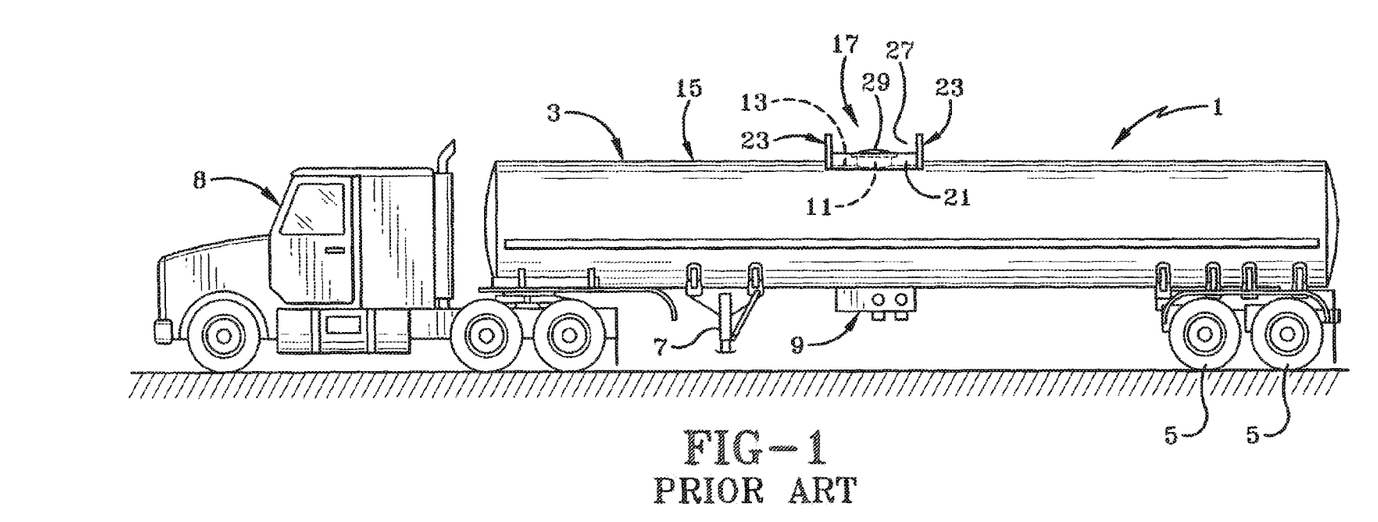
FIG. 1 is a diagrammatic side elevational view of a tank trailer showing a usual prior art hatch assembly mounted on the top thereof.

FIG. 1 illustrates a prior art tank trailer and cab having one type of hatch assembly mounted thereon on which the wind deflector assembly of the present invention will be retrofitted. This prior art tank trailer is indicated generally at 1, and is of a usual construction consisting of an elongated, usually cylindrical tank body 3, which is supported by one or more pairs of wheel assemblies 5 and will be equipped with various front support legs 7, and will have various valves and other controls indicated generally at 9. The types of controls 9 and shape of body 3 will be dependent upon the particular fluid or fluidized material to be transported within a hollow interior of tank body 3. A usual cab 8 provides the pulling force for the tank trailer.

Figure 2:
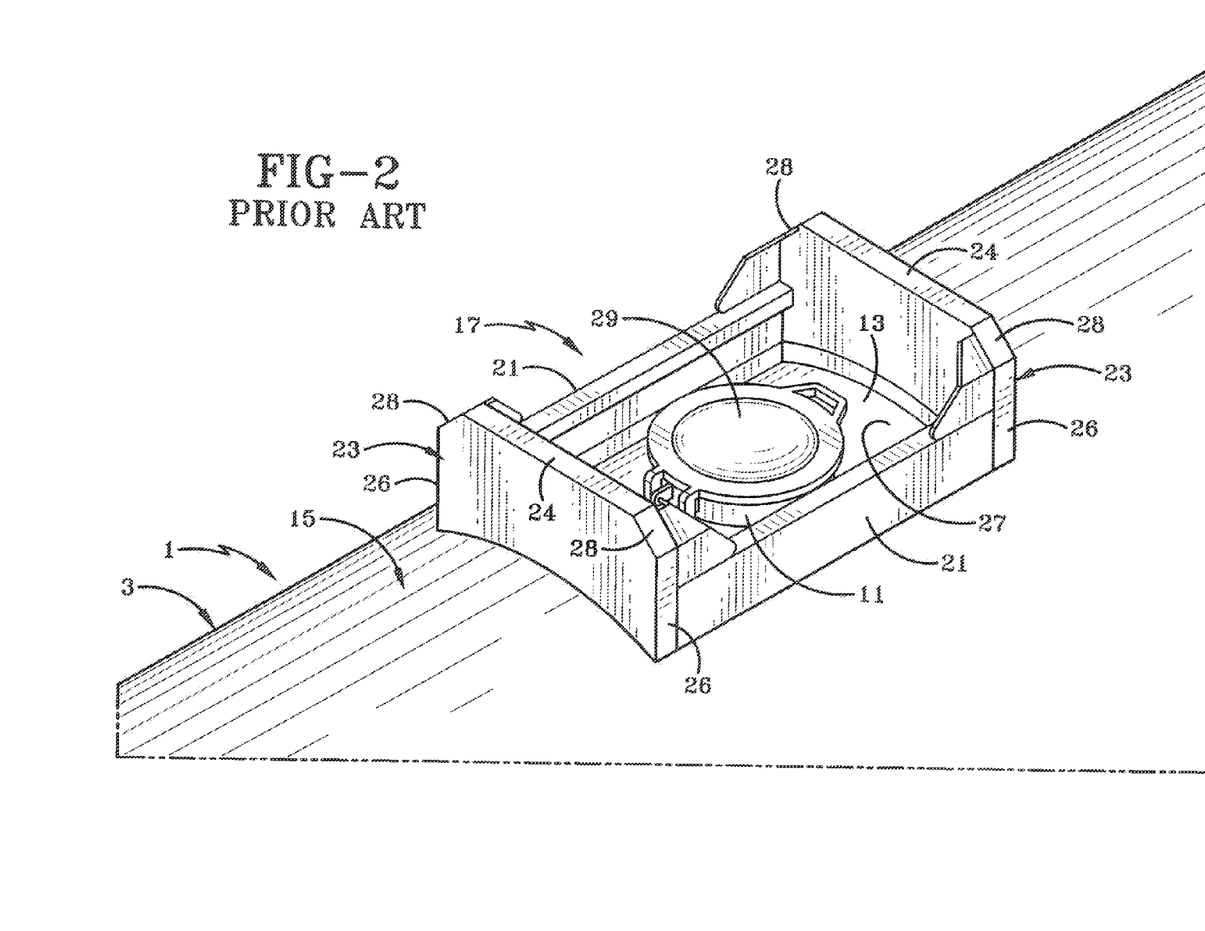
FIG. 2 is an enlarged fragmentary perspective view of the prior art hatch assembly shown in FIG. 1.
Figure 3:
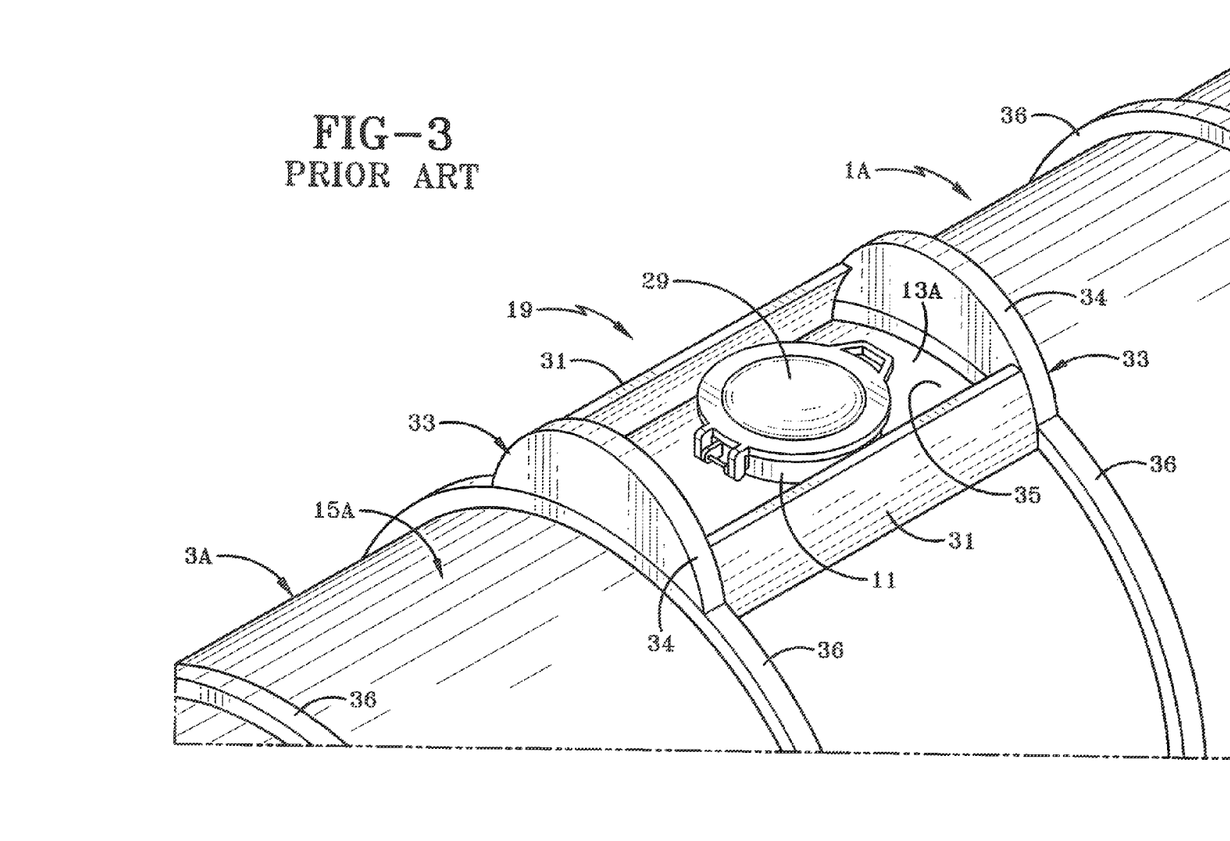
FIG. 3 is an enlarged fragmentary sectional view similar to FIG. 2 showing another type of prior art hatch assembly.

FIG. 2 shows one type of prior art access port 11 formed in the top wall portion 13 of cylindrical wall 15 which forms tank body 3 to provide access to an interior chamber of the tank body. Access port 11 is protected on many tank bodies by various hatch assemblies, one type of which is indicated at 17 and is shown in FIG. 2. Another type of protective hatch assembly is shown in FIG. 3 and is indicated generally at 19. These are just two examples of prior art hatch assemblies present on many tank trailers which can be retrofitted with the wind deflector assembly of the present invention.

Prior art hatch assembly 17 includes spaced parallel side members 21 which extend between a pair of end walls 23. End walls 23 have a generally rectangular configuration with a flat top edge 24 and straight side edges 26 connected by an angled edge 28. End walls 23 define an intervening opening 27 which provides access to a hatch covering 29 which removably covers access port 11.

Prior art hatch assembly 19 (FIG. 3) has a pair of side walls 31, which extend between a pair of generally semi-circular shaped end walls or plates 33 which define an intervening opening 35 therebetween. End walls 33 each have a smooth semi-circular top edge 34 which may merge into ribs 36 that are present on many types of tank trailer bodies. End walls 33 and side walls 31 provide protection to hatch covering 29.

Figure 4:
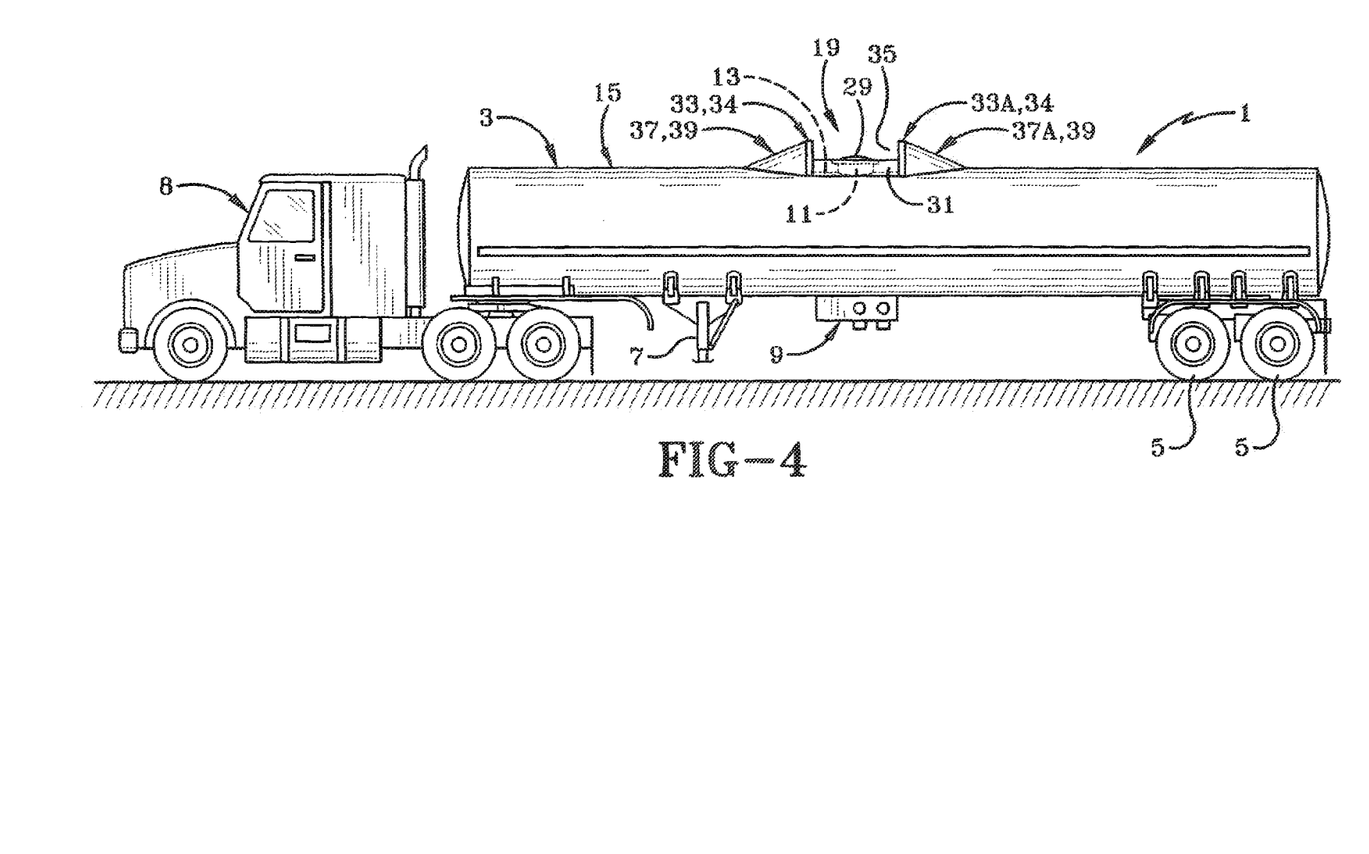
FIG. 4 is a diagrammatic side elevational view of a tank trailer having a first embodiment of the wind deflector of the present invention mounted thereon.
Figure 5:
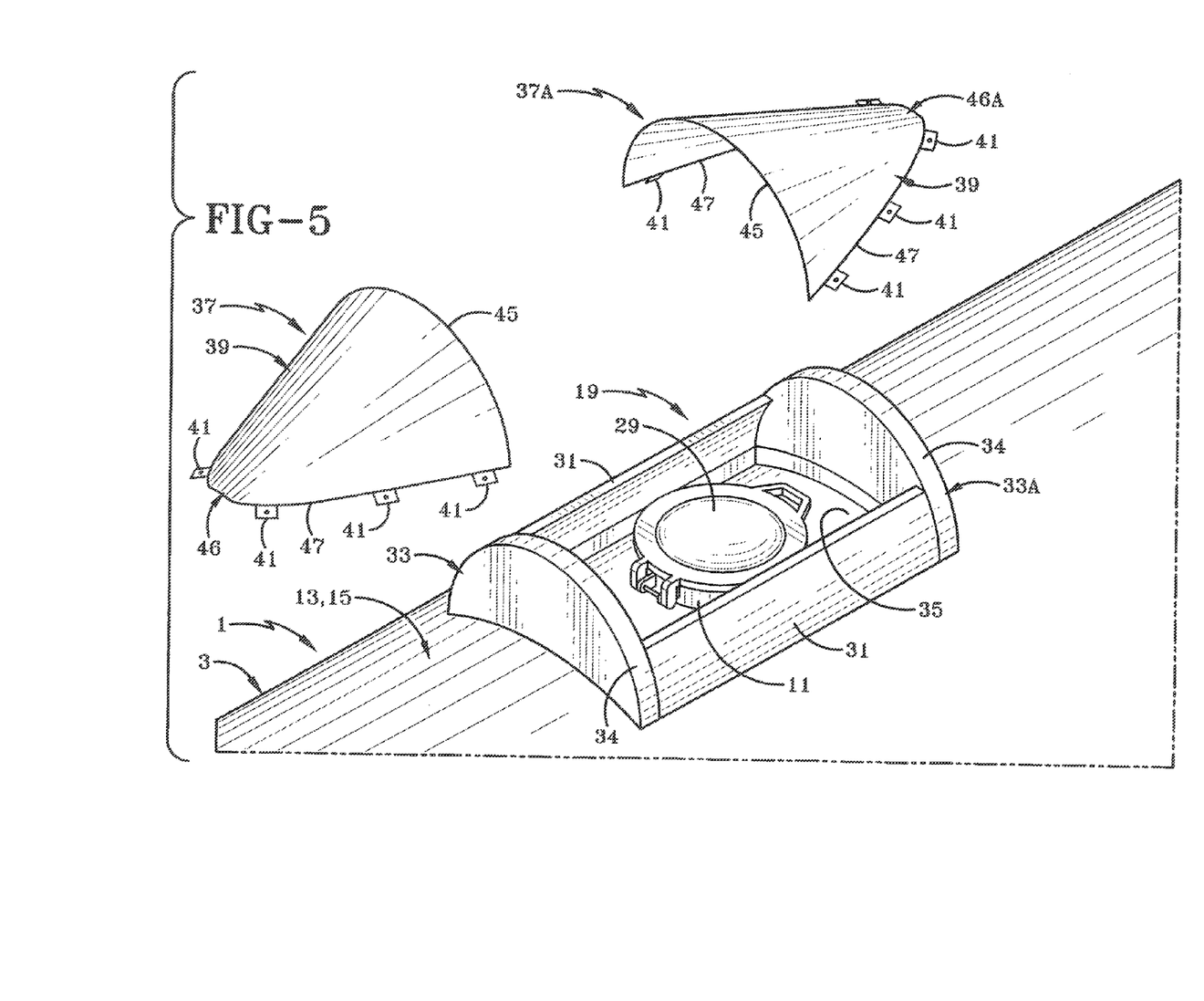
FIG. 5 is an enlarged exploded perspective view of the wind deflector of FIG. 4.
Figure 6:
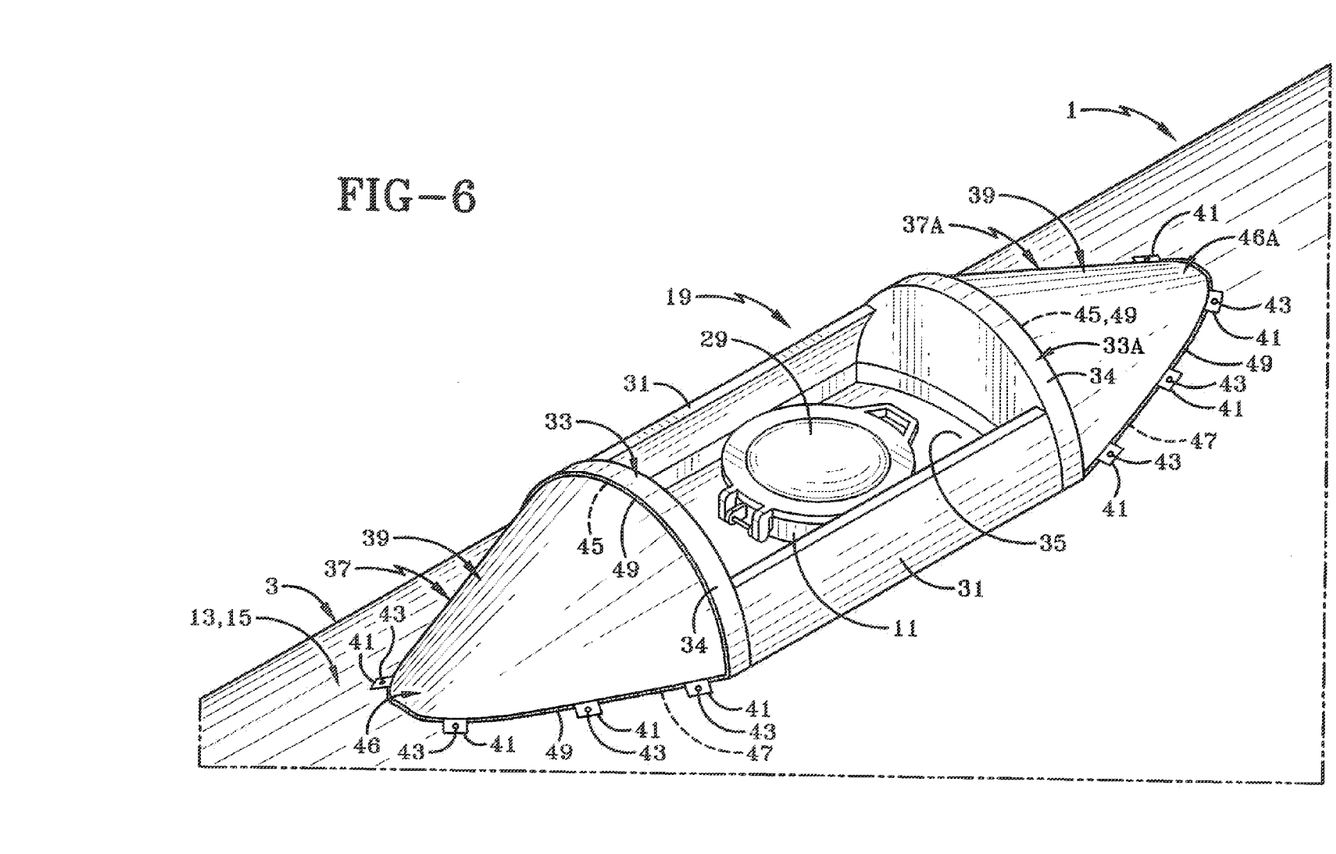
FIG. 6 is an enlarged fragmentary perspective view of the wind deflector of FIG. 5 attached to the top of a tank trailer.
Figure 7:
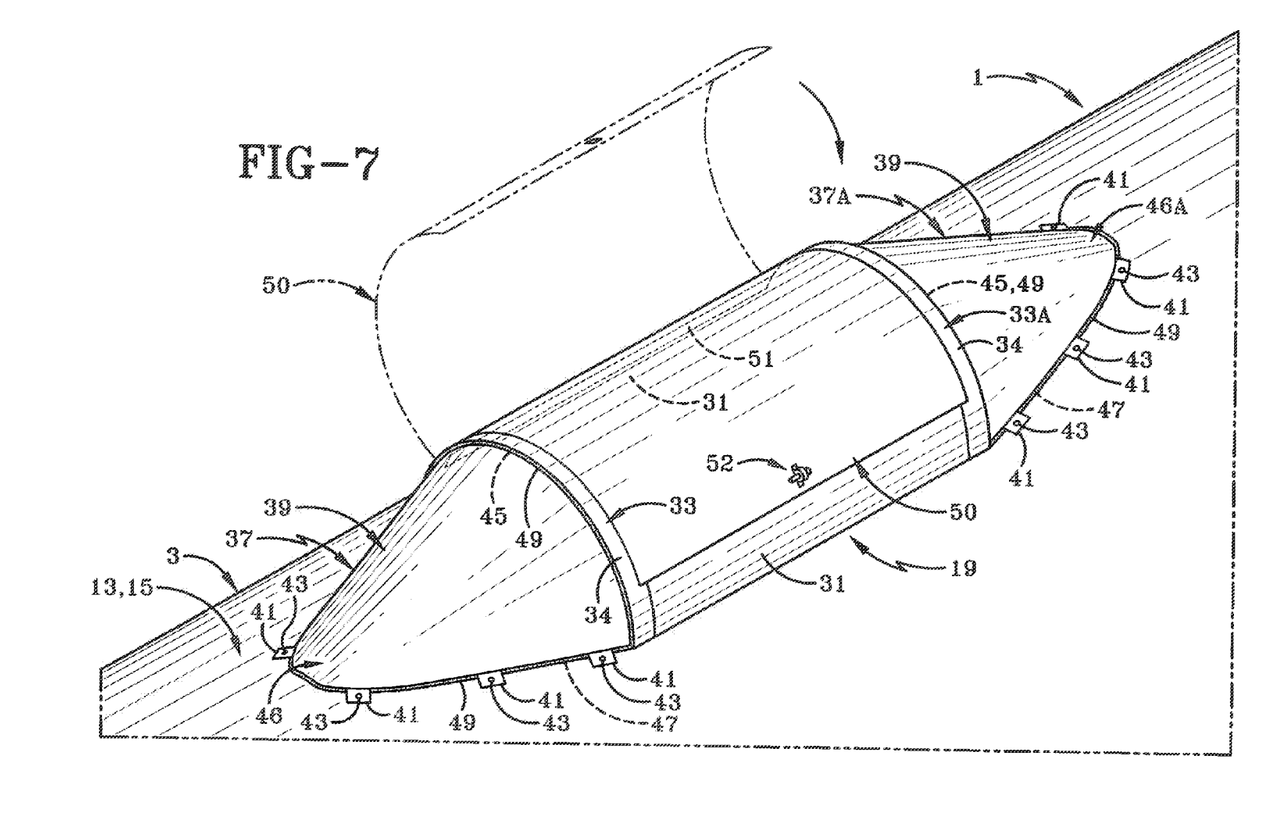
FIG. 7 is an enlarged fragmentary view showing the wind deflector of FIG. 6 with a closure member shown in full closed position and in dot dash open position.

A first embodiment of the wind deflector assembly of the present invention is indicated generally at 37, and is shown as part of hatch assembly 19 (FIG. 4). Wind deflector assembly 37 is best illustrated in FIGS. 5-8. Wind deflector assembly 37 includes a smooth, continuous sheet of material 39 preferably formed of metal, which is shaped into a semi-conical configuration as best shown in FIG. 5. Sheet 39 of deflector assembly 37 is secured to the skin of tank body 3 (FIG. 6) by a plurality of tabs 41 and fasteners, such as rivets 43 (FIGS. 6 and 7). Tabs 41 preferably are formed integrally with sheet material 39 of deflector assembly 37. The semi-conical sheet 39 has a generally semi-circular planar inner edge 45 and a bottom edge 47 which mate against front end wall 33 of hatch assembly 19 and the upper top wall portion 13 of cylindrical wall 15 of tank body 3 and conforms with top edge 34 of end wall 33. A sealant 49 (FIG. 6) preferably is placed about the junction of sheet 39 and front end wall 33 and tank body 3 to provide a wind tight seal therebetween.

Preferably a similar second wind deflector indicated as 37A is secured to hatch assembly rear end plate 33A in a similar manner as is the first deflector sheet 39 and is sealed against the end plate and tank body 3 by sealant 49 in a similar manner as that described above with respect to sheet 39. This forms a second air deflector assembly which extends in a rearward downwardly sloped direction opposite from that of forward directed downwardly sloped wind deflector 37. This rearward sloped configuration of rear deflector 37A reduces the formation of eddy currents which form behind an upstanding wall of a vehicle when moving in a forward direction.

Preferably sheets 39 of wind deflectors 37 and 37A each terminate in a generally rounded nose 46 and 46A which provide for the smooth merger into tank body 3. Wind deflectors 37 and 37A discussed above can be easily added on or retrofitted to an existing tank body having an existing type of prior art hatch assembly 19 which has the particular semicircular-shaped end walls 33 and 33A described above.

Another feature of wind deflector assembly 37 is providing a closure member or door 50 (FIG. 7) which extends between end walls 33 to provide a covering over opening 27 to further reduce wind drag. Closure member 50 may be pivotally mounted by a hinge 51 on one of the side walls 31 as shown in FIG. 7, or could be slidably mounted thereon (not shown). Closure member 50 has a smooth semi-circular shape that when in the closed position provides a smooth surface which together with wind deflectors assemblies 37 and 37A considerably reduces air drag heretofore caused by the hatch assembly. A latch 52 or other device will ensure closure member 50 remains in a closed position during transit.

Figure 8:
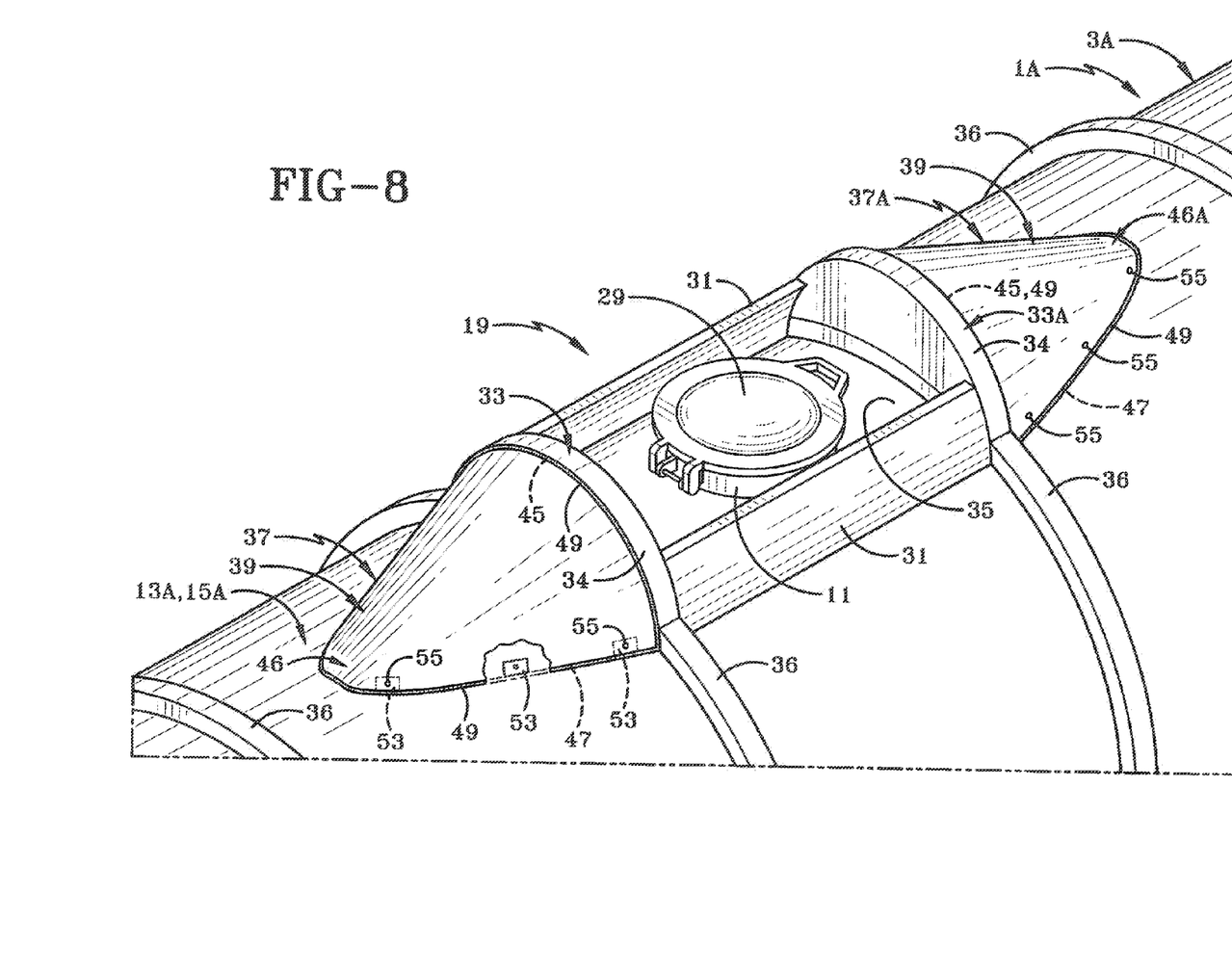
FIG. 8 is an enlarged fragmentary perspective view with portions broken away of another type of mounting arrangement for the wind deflectors of the present invention.

FIG. 8 shows a modified wind deflector having tabs 53 which are welded directly to the tank body and then connected to the curved deflector sheet 39 instead of being formed as part of sheet 39. This fastening arrangement preferably will be used with tank bodies void of an outer skin whereas the fastening arrangement shown on FIGS. 6 and 7 and discussed above will be used with tank bodies having an outer skin. The tank body shown in FIG. 8 is a variation from that discussed above and may be provided with circumferentially extending spaced ribs 36 showing how the wind deflector of the present invention is adaptable to a variety of tank bodies.

It is also understood that deflectors somewhat similar to deflectors 37 and 37A can be constructed having a generally smooth tapered outer surfaces as that of sheet material 39 and formed with an inner edge configuration complementary to that of one or both end walls 23 of a prior art hatch assembly 17 as shown in FIG. 2. This is accomplished by merely changing the shape of the end edge of a sheet of rigid material for conforming it to the size and shape of end walls 23. When attached to the end wall 23, it will have the sealant applied thereto as well as the use of tabs 41 and suitable fasteners such a rivets 43, for securing the bottom edges to the tank body with a sealant 49 applied thereto.

Figure 9:
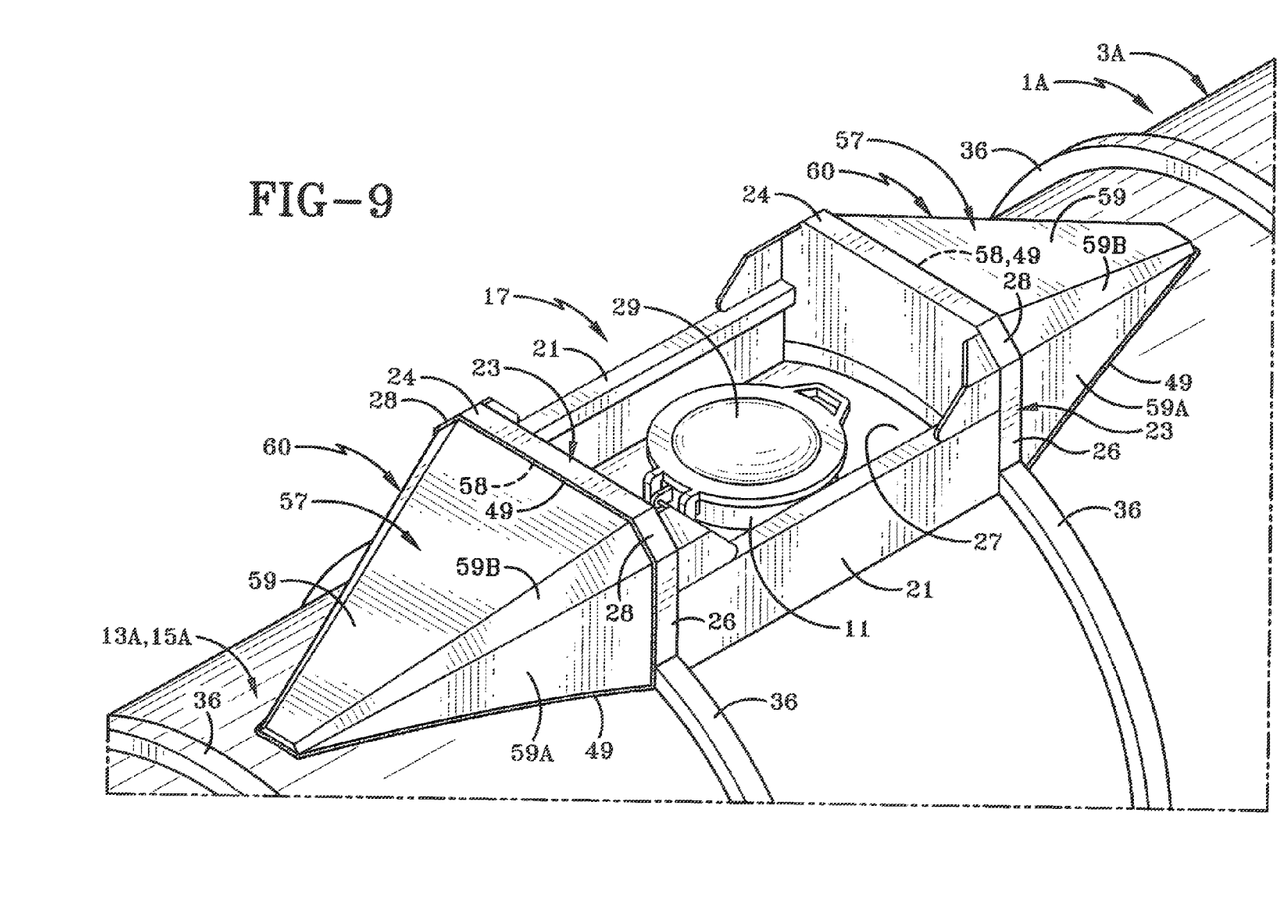
FIG. 9 is an enlarged fragmentary perspective view of another type of hatch assembly with a pair of modified wind deflectors mounted thereon.

As shown in FIG. 9, a sheet of material 57 preferably generally rigid metal, will be bent into a generally truncated configuration to form a front wind deflector indicated generally at 60. Deflector 60 will have an inner edge 58 which matches the contour of edges 24, 26 and 28 of end wall 23 and will have a downwardly sloped generally triangular-shaped front section 59, outwardly flared generally triangular-shaped side sections 59A and intervening generally triangular-shaped connecting sections 59B. All of these sections taper downwardly forwardly from front end wall 23. Again, a sealant 49 preferably will be applied between sheet 60 and end wall 23 and the tank body.

A similarly shaped rear deflector shield 57 will be attached to the rear end wall 23 and slope downwardly rearwardly therefrom to reduce the formation of drag producing eddy currents.

Figure 10:
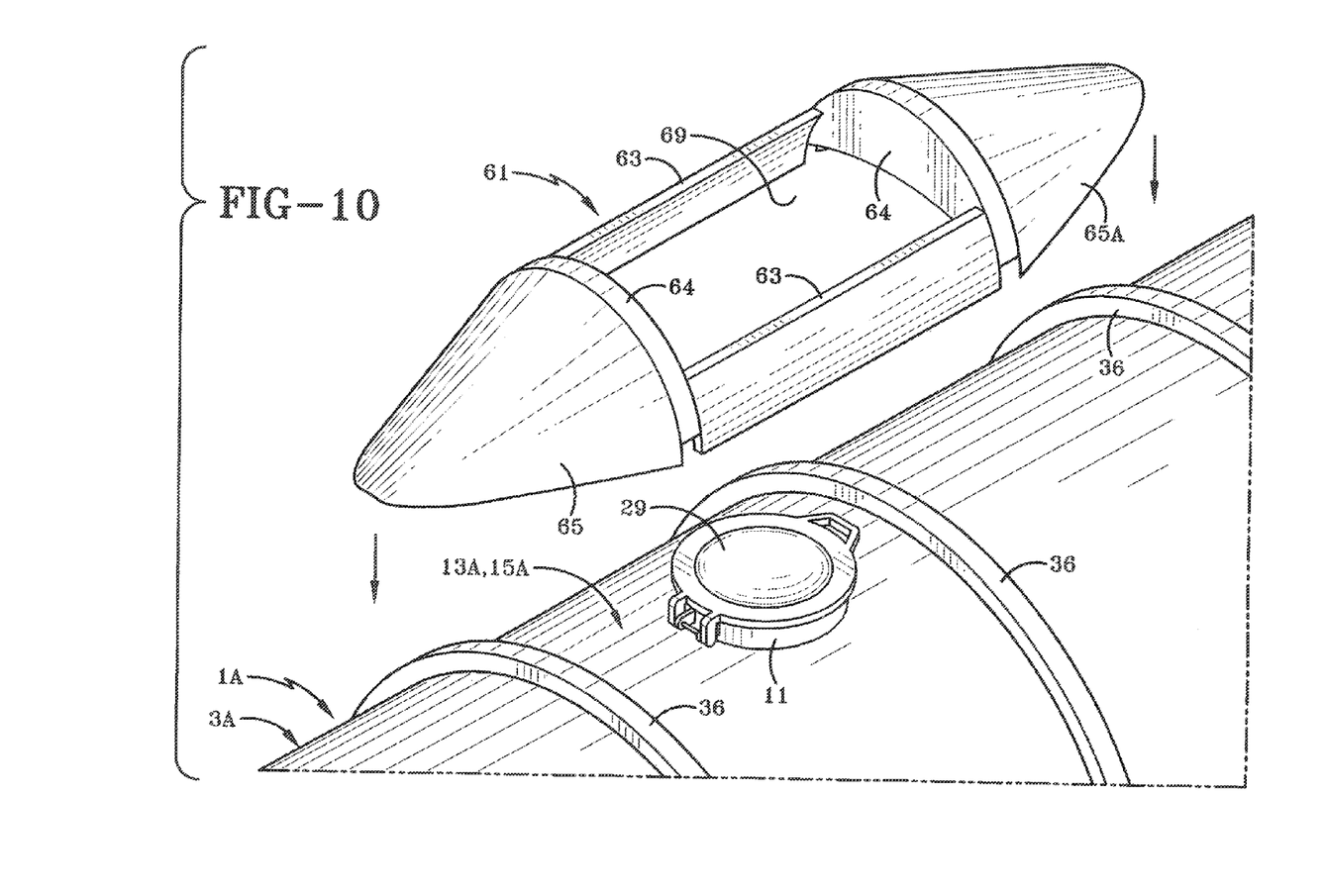
FIG. 10 is an enlarged fragmentary exploded perspective view showing a second embodiment of the wind deflector of the present invention prior to being mounted on the top of a tank trailer.

Another embodiment of the wind deflector of the present invention is indicated generally at 61, and is shown particularly in FIG. 10. Wind deflector assembly 61 is an integral member preferably formed of metal, which includes a pair of side members 63, which extend generally parallel to each other between a pair of spaced end walls 64. A pair of wind deflectors 65 and 65A, each having a generally semi-conical configuration similar to that of wind deflectors 37 and 37A described above, are attached to end walls 64 and extend outwardly in opposite directions. End walls 64 are similar in construction and configuration to end walls 33 discussed above. An intervening opening 69 is defined by side members 63 and end walls 64 which provides access to hatch cover 29 of access port 11.

Wind deflector assembly 61 will be mounted on tank body 3 at the time of its fabrication or can easily be placed on and secured to the top surface of an existing tank body by welding or by the use of tabs and fasteners such as tabs 41 and rivets 43 discussed above, when such a tank body does not have an existing hatch assembly such as hatch assemblies 17 and 19 discussed above. When secured to the tank body and properly sealed therewith, deflector assembly 61 provides the aerodynamic configuration around the hatch assembly as that described above for deflector assembly 37.

An enclosure member or door (not shown) such as member 50 as shown in FIG. 7, preferably is attached to one of the side walls 63 of wind deflector assembly 61, and will have a curved configuration so that when in a closed position, provides for a smooth continuous air flow surface over and around the wind deflector assembly.

Figure 11:
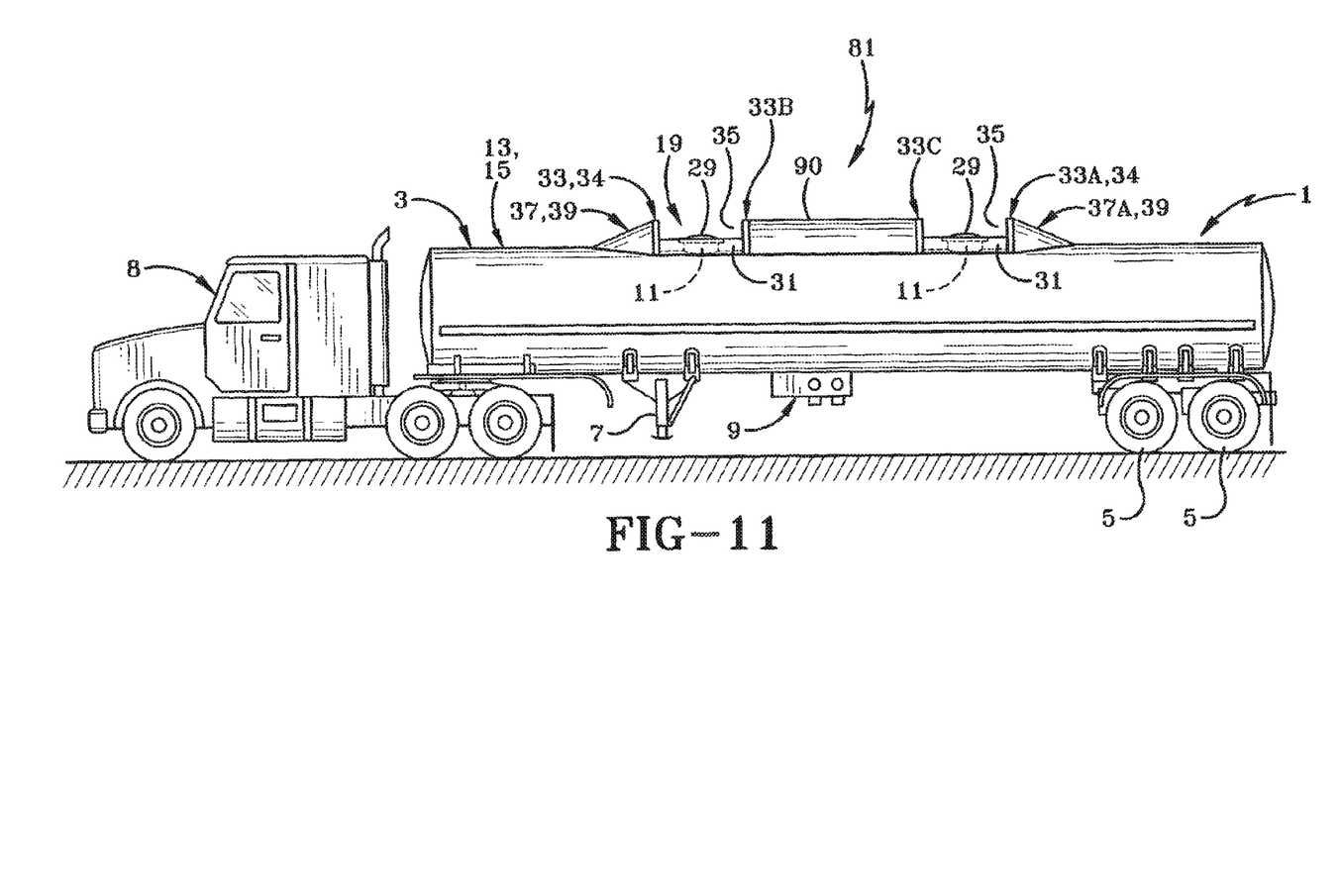
FIG. 11 is a diagrammatic side elevational view showing another embodiment of the wind deflector assembly of the present invention.
Figure 12:
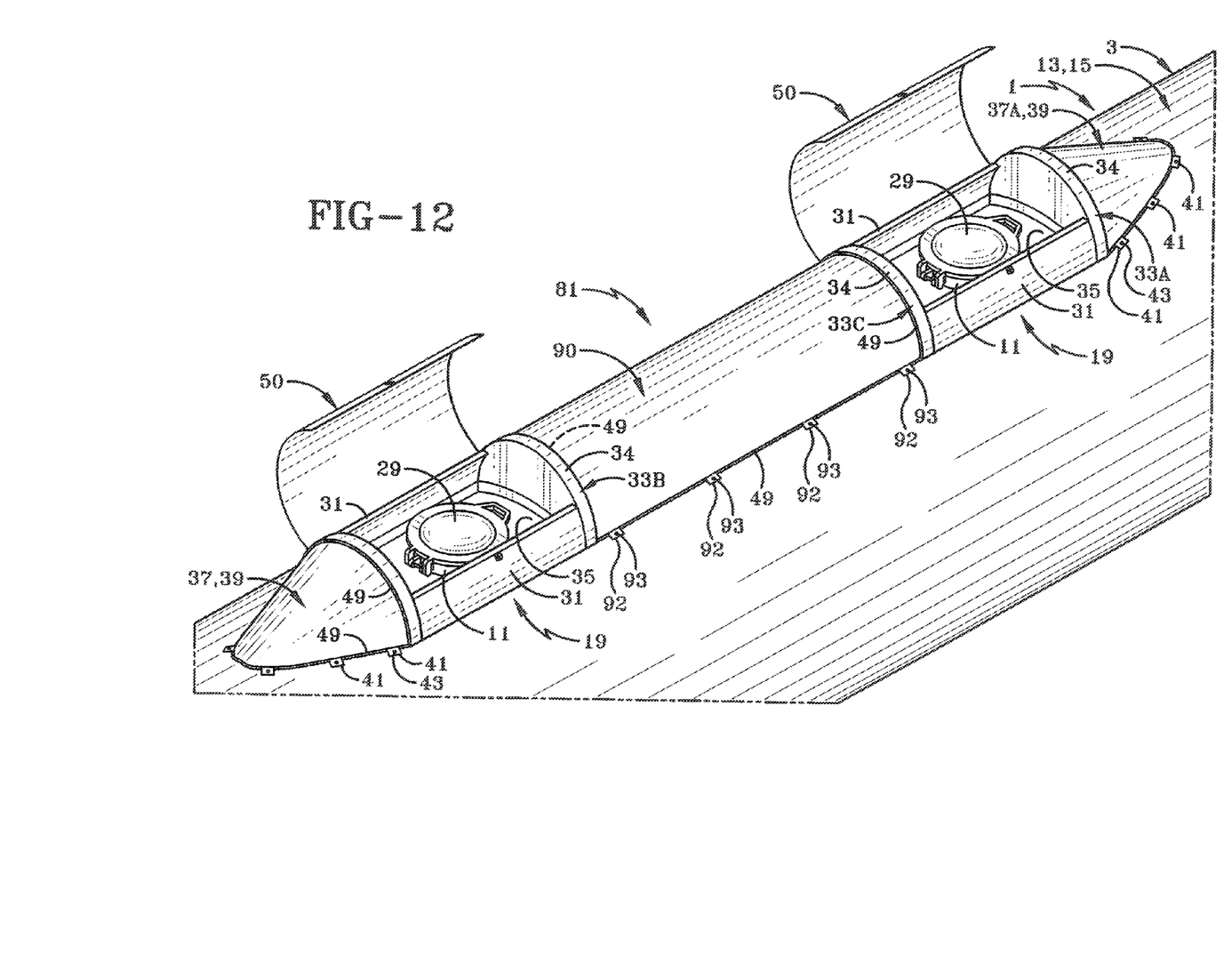
FIG. 12 is a fragmentary top perspective view of the wind deflector assembly shown in FIG. 11 with a pair of closure members in open position.

Still another embodiment of the present invention is a wind deflector assembly indicated generally at 81, and shown particularly in FIGS. 11 and 12. Wind deflector assembly 81 is generally similar to that of deflector assemblies 37 and 61 described above except it is for use on a tank trailer having a spaced pair of access ports 11 formed in the top of a tank body 3 surrounded by hatch assemblies 17 or 19.

The forward hatch assembly 19 will have a wind deflector assembly 37 attached thereto with a wind deflector sheet 39 secured by tabs 41 and rivets 43 or other attachments to the tank body and to the forward end plate 33 as discussed above, and preferably will have a closure member 50 mounted thereon. A rearwardly facing wind deflector assembly 37A will have a wind deflector sheet 39A attached to end plate 33A of the rear hatch assembly 19 in a similar manner and preferably includes a closure member 50 (not shown) mounted thereon. A smooth curved member 90 is secured to spaced end walls 33B and 33C of the spaced hatch assemblies and secured to tank body 3 by various fasteners such as tabs 92 and rivets 93. Member 90 together with front and rear wind deflectors assemblies 37 and 37A and closure members 50 provide a continuous smooth aerodynamic surface extending along the top surface of the tank body covering two or more access ports provided thereon. It is also understood that deflector assembly 81 could be a single integral member mounted on top of the tank for new tank bodies or attached to existing tank bodies without protective hatch assemblies adjacent the pair of access ports.

Thus in accordance with the invention, the tank body of a tank trailer can be fabricated with various wind deflectors adjacent a hatch assembly associated with one or more access ports along the top of the tank or can be provided as a retrofit add-on to existing tank bodies having various configured hatch assemblies extending upwardly from the top of the tank. These wind deflector assemblies, either in a new tank construction or as an add-on, will assist in reducing drag on the tank body by providing for a smooth continuous airflow surface along the top of the tank eliminating the heretofore upstanding flat wall surfaces provided by prior hatch assembly constructions. These wind deflector arrangements assist to reduce drag thereby increasing fuel efficiency during the transport of the tank trailer.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tanker truck comprising:
   a cab;
   a tank trailer operatively engaged with the cab; wherein said tank trailer includes:
   a tank having tank walls defining an interior chamber, a front tank end and a rear tank end; and an access port defined in an upper tank wall and located between the front tank end and the rear end;
   a hatch assembly provided on the upper tank wall adjacent the access port; said hatch assembly extending outwardly from an exterior surface of the upper tank wall; and
   a first wind deflector mounted on the upper tank wall adjacent the hatch assembly and sloping downwardly and forwardly from the hatch assembly toward the front tank end and in a direction of travel of the tanker truck; said first wind deflector being provided for controlling air flow around the hatch assembly.

2. The tanker truck defined in claim 1 wherein the first wind deflector has a generally semi-conical configuration with a continuous smooth curved outer surface.

3. The tanker truck defined in claim 1 including a plurality of tabs for attaching the wind deflector to the tank.

4. The tanker truck defined in claim 1 wherein the hatch assembly includes a front assembly wall and a rear assembly wall defining a space therebetween; wherein the access port is located in the space between the spaced front and rear assembly walls; and wherein the first wind deflector is attached to the front assembly wall and tapers downwardly forwardly therefrom toward the front tank end.

5. The tanker truck defined in claim 4 including a sealant extending along edges of the first wind deflector which mates with the upper tank wall and the front assembly wall.

6. The tanker truck defined in claim 4 wherein a second wind deflector is attached to the rear assembly wall and tapers downwardly and rearwardly therefrom and toward the rear tank end.

7. The tanker truck defined in claim 4 wherein at least the front assembly wall of the hatch assembly has a generally semi-circular top edge; and wherein an end periphery of the first wind deflector is complementary to the shape and size of the top edge of said front assembly wall.

8. A tanker truck comprising:
   a cab;
   a tank trailer operatively engaged with the cab; wherein said tank trailer includes:
   a tank having tank walls extending between a front tank end and a rear tank end; said tank walls defining an interior chamber; and an upper access port located between the front tank end and the rear tank end;
   a hatch assembly adjacent the access port and extending upwardly from the tank; and
   a first wind deflector mounted on the tank adjacent the hatch assembly and sloping downwardly and forwardly from the hatch assembly toward the front tank end for controlling air flow around the hatch assembly; wherein the first wind deflector is formed as part of a wind deflector assembly which includes a second wind deflector connected to the first wind deflector by spaced side members which define an intervening opening between the first and second wind deflectors; wherein the access port is located in the intervening opening; and wherein said first and second wind deflectors each have a substantially smooth surface tapered downwardly toward the tank in opposite directions from each other to provide aerodynamic surfaces for the hatch assembly.

9. The tanker truck defined in claim 8 wherein the first and second wind deflectors of the wind deflector assembly each has a generally smooth semi-conical configuration terminating in a substantially rounded nose attached to the tank.

10. The tanker truck defined in claim 8 wherein the wind deflector assembly includes a pair of spaced upstanding deflector walls defining the intervening space; and in which each of the first and second wind deflectors is attached to a respective one of said deflector walls.

11. The tanker truck defined in claim 8 wherein the wind deflector assembly includes a moveable cover member for selectively covering the intervening opening between the first and second wind deflectors.

12. The tanker truck defined in claim 11 wherein the cover member is pivotably attached to the wind deflector assembly.

13. The tanker truck defined in claim 8 wherein the tank has a pair of access ports spaced along an upper portion tank wall and between the front tank end and the rear tank end; and in which the wind deflector assembly includes a pair of spaced intervening openings for receiving a respective one of the pair of hatch assemblies therein; and in which a generally smooth curved surface extends over the pair of intervening openings.

14. A tanker truck comprising:
   a cab;
   a tank trailer operatively engaged with the cab; wherein said tank trailer includes:
   a tank having tank walls extending between a front tank end and a rear tank end; said tank walls defining an interior chamber; and an upper access port located between the front tank end and the rear tank end;
   a hatch assembly adjacent the access port and extending upwardly from an upper tank wall; and wherein the hatch assembly includes a front assembly wall and a rear assembly wall defining a space therebetween; wherein the access port is located in the space between the spaced front and rear assembly walls;
   a first wind deflector mounted on the tank adjacent the hatch assembly and sloping downwardly and forwardly from the hatch assembly toward the front tank end for controlling air flow around the hatch assembly; and wherein the first wind deflector is attached to the front assembly wall and tapers downwardly and forwardly therefrom toward the front tank end; and wherein the first wind deflector has a substantially planar rear edge which conforms to a front face of the front assembly wall, a bottom edge which conforms to the upper wall of the tank, and a smooth curved front surface having a substantially semi-conical configuration.

15. A tanker truck comprising:
   a cab;
   a tank trailer operatively engaged with the cab; wherein said tank trailer includes:
   a tank having tank walls defining an interior chamber and an upper access port located between a front tank end and a rear tank end of the tank;
   a hatch assembly adjacent the access port and extending upwardly from the tank; and
   a first wind deflector mounted on the tank adjacent the hatch assembly and sloping downwardly and forwardly from the hatch assembly toward the front tank end for controlling air flow around the hatch assembly; wherein the first wind deflector has a generally truncated configuration with a generally triangular-shaped central section, a pair of generally triangular-shaped side sections and a pair of generally triangular-shaped intervening sections.

16. A wind deflector assembly for mounting on an upper surface of a tank of a tank trailer of the type having an access port on the tank communicating with an interior storage chamber of the tank; said wind deflector assembly comprising a pair of wind deflectors connected by side members and separated by an intervening opening adapted to receive the access port therein; and wherein each of the wind deflectors has a smooth downwardly tapered surface extending in opposite directions from each other for controlling wind flow around the access port when the wind deflector assembly is mounted on the tank.

17. The wind deflector assembly as defined in claim 16 wherein the wind deflector assembly includes a pair of spaced upstanding deflector walls defining the intervening opening; and in which each of the first and second wind deflectors is attached to a respective one of said deflector walls.

18. The wind deflector assembly as defined in claim 17 wherein the wind deflector assembly includes a moveable cover member for selectively covering the intervening opening between the first and second wind deflectors.

19. The wind deflector assembly as defined in claim 18 wherein the cover member is pivotably attached to the wind deflector assembly.

20. A wind deflector assembly for mounting on an upper surface of a tank of a tank trailer having a pair of access ports spaced along an upper tank wall and located between a front tank end and a rear tank end; said wind deflector assembly includes a pair of hatch assemblies adapted to be located adjacent the pair of access ports, each hatch assembly having an opening for receiving a respective one of the pair of hatch assemblies therein, each of said openings being defined by a pair of spaced assembly walls; a generally smooth surface extending between the pair of openings; and a wind deflector attached to one of the spaced assembly walls of each of the hatch assemblies, said wind deflectors extending in opposite directions from each other.

21. The combination as defined in claim 1, wherein the first wind deflector has a first end and a terminal nose remote therefrom; and wherein the first end of the first wind deflector is disposed adjacent the hatch assembly and the nose is disposed remote from the hatch assembly; and the nose is further disposed adjacent the exterior surface of the upper tank wall to which the first wind deflector is mounted.

22. The combination as defined in claim 21, wherein the terminal nose is rounded.

23. The combination as defined in claim 21, wherein the first wind deflector includes a bottom edge which extends between the first wind deflector's first end and the nose; and the bottom edge is disposed adjacent the exterior surface of the upper tank wall to which the first wind deflector is mounted.

24. The combination as defined in claim 21, wherein the first wind deflector includes a sloped surface that is adapted to be inclined at an angle of less than 90° relative to the upper tank wall.

* * * * *

UNITED STATES PATENT AND TRADEMARK OFFICE
CERTIFICATE OF CORRECTION

| | |
|---|---|
| PATENT NO. | : 8,845,008 B1 |
| APPLICATION NO. | : 13/828679 |
| DATED | : September 30, 2014 |
| INVENTOR(S) | : Maiorana et al. |

It is certified that error appears in the above-identified patent and that said Letters Patent is hereby corrected as shown below:

In the Claims

Column 7, line 29 (Claim 13) "an upper portion tank wall" should be changed to --an upper tank wall--.

Signed and Sealed this
Seventeenth Day of February, 2015

Michelle K. Lee
*Deputy Director of the United States Patent and Trademark Office*